(12) United States Patent
Kasamatsu et al.

(10) Patent No.: US 8,288,038 B2
(45) Date of Patent: Oct. 16, 2012

(54) SEPARATOR AND NON-AQUEOUS ELECTROLYTE SECONDARY BATTERY

(75) Inventors: Shinji Kasamatsu, Osaka (JP); Kazuhiro Okamura, Osaka (JP)

(73) Assignee: Panasonic Corporation, Osaka (JP)

( * ) Notice: Subject to any disclaimer, the term of this patent is extended or adjusted under 35 U.S.C. 154(b) by 1197 days.

(21) Appl. No.: 12/067,910

(22) PCT Filed: May 17, 2007

(86) PCT No.: PCT/JP2007/060144
§ 371 (c)(1),
(2), (4) Date: Mar. 24, 2008

(87) PCT Pub. No.: WO2007/135952
PCT Pub. Date: Nov. 29, 2007

(65) Prior Publication Data
US 2010/0151325 A1    Jun. 17, 2010

(30) Foreign Application Priority Data
May 22, 2006   (JP) .................................. 2006-141741

(51) Int. Cl.
*H01M 4/00*   (2006.01)
*H01M 2/16*   (2006.01)

(52) U.S. Cl. ......... 429/309; 429/129; 429/188; 429/304

(58) Field of Classification Search .................. 429/129, 429/188, 204, 309
See application file for complete search history.

(56) References Cited

U.S. PATENT DOCUMENTS 5,728,331 A * 3/1998 Stempin et al. ................. 264/44
5,731,074 A   3/1998 Nishiyama et al.
(Continued)

FOREIGN PATENT DOCUMENTS
JP   05-025305   * 2/1993
(Continued)

OTHER PUBLICATIONS

Korean Office Action issued in Korean Patent Application No. 10-2008-7011066, dated Jun. 30, 2010.
(Continued)

*Primary Examiner* — Ula C Ruddock
*Assistant Examiner* — Amanda Barrow
(74) *Attorney, Agent, or Firm* — McDermott Will & Emery LLP

(57) ABSTRACT

In a non-aqueous electrolyte secondary battery, a separator in which its dynamic hardness DH obtained when the load to an indenter reaches 12 kgf/cm$^2$ is 1000 or more is used. This separator includes at least one porous layer X including a polyolefin, and at least one porous layer Y including a heat resistant resin. The porosity of the porous layer X is 35% or more and 65% or less. In a pore size distribution of the porous layer X measured with a mercury porosimeter, a ratio of pores having a pore size of 0.02 μm or more and 0.2 μm or less is 40 vol % or more relative to a total pore volume. The thermal deformation temperature of the heat resistant resin is 160° C. or more.

7 Claims, 1 Drawing Sheet

U.S. PATENT DOCUMENTS

| | | | |
|---|---|---|---|
| 5,858,264 A * | 1/1999 | Ichino et al. | 252/62.2 |
| 5,922,492 A * | 7/1999 | Takita et al. | 429/249 |
| 6,245,272 B1 * | 6/2001 | Takita et al. | 264/210.4 |
| 6,287,720 B1 * | 9/2001 | Yamashita et al. | 429/131 |
| 6,432,586 B1 * | 8/2002 | Zhang | 429/251 |
| 6,627,346 B1 | 9/2003 | Kinouchi et al. | |
| 2001/0005560 A1 * | 6/2001 | Yoshida et al. | 429/144 |
| 2004/0076882 A1 * | 4/2004 | Hosoya et al. | 429/223 |
| 2005/0019665 A1 * | 1/2005 | Adachi et al. | 429/254 |
| 2005/0037257 A1 * | 2/2005 | Akashi et al. | 429/144 |
| 2005/0098913 A1 * | 5/2005 | Funaoka et al. | 264/41 |
| 2006/0051675 A1 * | 3/2006 | Musha et al. | 429/231.95 |
| 2006/0068293 A1 * | 3/2006 | Kim et al. | 429/231.95 |

FOREIGN PATENT DOCUMENTS

| | | | |
|---|---|---|---|
| JP | 5-25305 | | 2/1993 |
| JP | 6-208849 | | 7/1994 |
| JP | 06-208849 | * | 7/1994 |
| JP | 08-244152 A | | 9/1996 |
| JP | 09-216964 | * | 8/1997 |
| JP | 10-294100 | | 11/1998 |
| JP | 11-322989 A | | 11/1999 |
| JP | 2000-285966 | | 10/2000 |
| JP | 2001-135295 | | 5/2001 |
| JP | 2001-200081 | * | 7/2001 |
| JP | 2001-229971 A | | 8/2001 |
| JP | 2002-246070 | | 8/2002 |
| JP | 2004-039492 A | | 2/2004 |
| JP | 2004-323820 | | 11/2004 |
| JP | 2004-363048 | | 12/2004 |
| JP | 2005-343936 | | 12/2005 |

OTHER PUBLICATIONS

Korean Office Action issued in Korean Patent Application No. 10-2008-7011066, mailed Jan. 31, 2011.

* cited by examiner

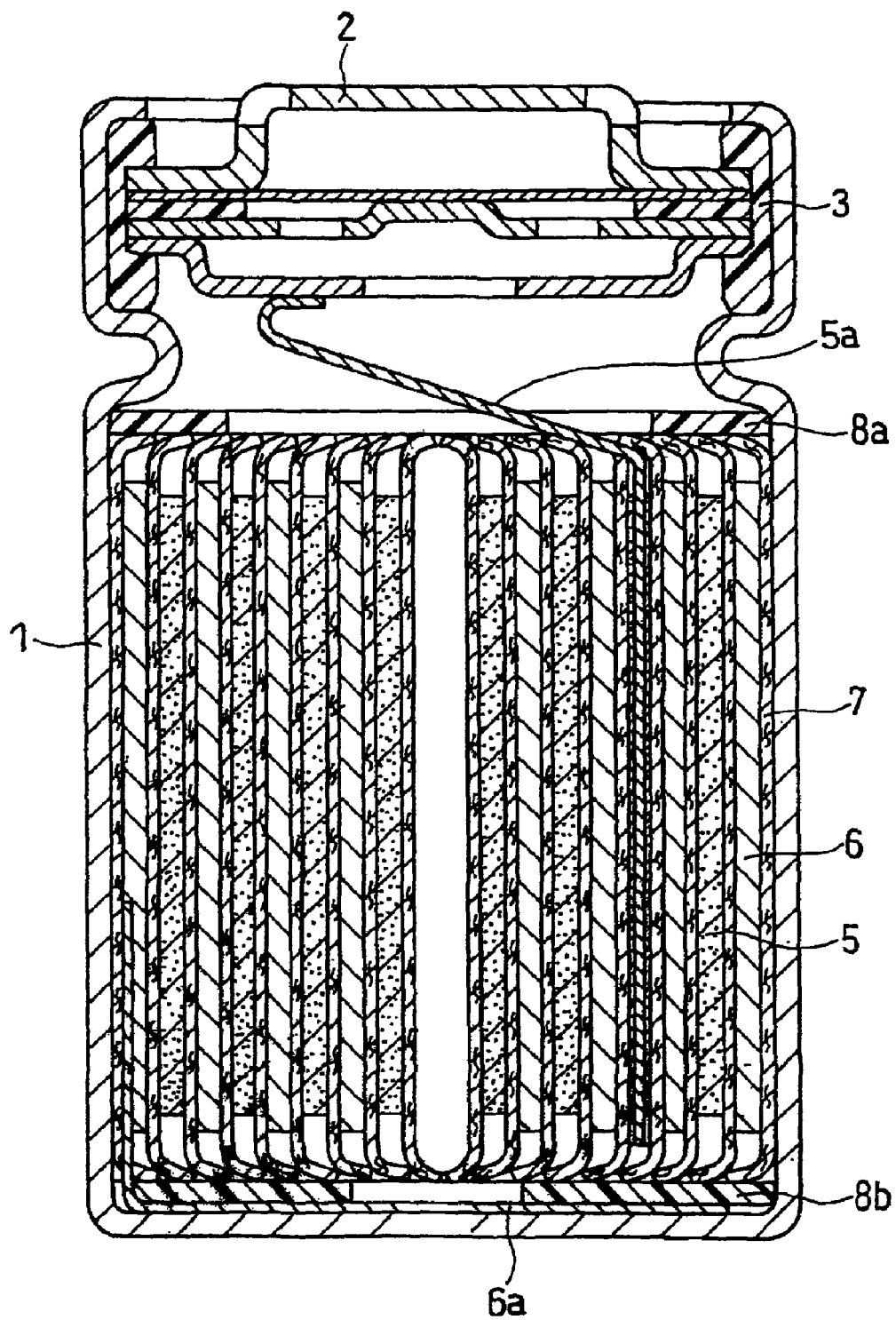

SEPARATOR AND NON-AQUEOUS ELECTROLYTE SECONDARY BATTERY

RELATED APPLICATIONS

This application is the U.S. National Phase under 35 U.S.C. §371 of International Application No. PCT/JP2007/060144, filed on May 17, 2007, which in turn claims the benefit of Japanese Patent Application No. JP 2006-141741, filed on May 22, 2006, the disclosures of which Applications are incorporated by reference herein.

TECHNICAL FIELD

The present invention mainly relates to an improvement of a separator for use in non-aqueous electrolyte secondary batteries. The separator of the present invention provides a non-aqueous electrolyte secondary battery excellent in cycle performance.

BACKGROUND ART

In recent years, there has been a rapid advancement in the development of portable and cordless electronic equipment for consumers. Accordingly, demand is growing for small-size and light-weight secondary batteries with higher energy density to serve as a power source for driving such electric equipment. In particular, non-aqueous electrolyte secondary batteries (e.g., lithium ion secondary batteries), because of their high voltage and high energy density, are expected to grow significantly in the future as a power source for notebook personal computers, cell phones, AV equipment, and the like. Nickel-cadmium storage batteries or nickel-metal hydride storage batteries including an alkaline aqueous solution as an electrolyte, which have been in the mainstream, have been replaced by lithium ion secondary batteries. Most of the non-aqueous electrolyte secondary batteries typically represented by the lithium ion secondary batteries include a porous film made of a polyolefin as a separator interposed between a positive electrode and a negative electrode.

In the non-aqueous electrolyte secondary batteries, there is a need to improve the cycle performance. In a cycle test, in association with repeated charge and discharge of the non-aqueous electrolyte secondary batteries, the battery performance is gradually reduced. One of the causes of the reduction in battery performance is in an expansion phenomenon of the negative electrode. For example, when the negative electrode includes graphite, the graphite absorbs lithium during charge. Accordingly, the negative electrode expands as a result of the charge. In addition, in the interface between the electrode and a non-aqueous electrolyte, a decomposition reaction of the electrolyte occurs as a side reaction during charge and discharge, and gas is generated. Notwithstanding an elevation of battery internal pressure due to the expansion of the negative electrode and the generation of gas, the internal volume of the battery hermetically sealed is not significantly changed. For this reason, a large pressure is also applied to between the positive electrode and the negative electrode.

A separator is interposed between the positive electrode and the negative electrode. The separator is porous and easily compressed or deformed as compared with the positive electrode and the negative electrode. In other words, the separator tends to be easily crushed when the battery internal pressure is elevated. In association with the compression or deformation of the separator, the voids (pore volume) in the separator are decreased. As a result, the amount of electrolyte impregnated into the voids of the separator is decreased, inhibiting the migration of lithium ions. Consequently, the battery resistance is gradually increased in association with the repeated charge and discharge.

Conventionally, the improvement on a separator for better cycle performance has been achieved by optimizing the impedance or air permeability of the separator. However, in reality, the compression or deformation of the separator as described above is considered to have a significant influence on the cycle performance.

In order to improve the cycle performance, one proposal suggests making the compressive modulus of the negative electrode larger than the compressive modulus of the positive electrode or the separator (Patent Document 1).

Another proposal suggests using a composite material including two or more types of polyethylene having different molecular weights by weight for a separator mainly composed of polyethylene (Patent Document 2).

Patent Document 1: Japanese Laid-Open Patent Publication No. 2000-285966

Patent Document 2: Japanese Laid-Open Patent Publication No. Hei 5-25305

DISCLOSURE OF THE INVENTION

Problem to be Solved by the Invention

The proposal in Patent Document 1 is effective in retaining the electrolyte in the negative electrode. However, it is not effective against the reduction in the cycle performance due to the compression or deformation of the separator.

The conventional separator as disclosed in Patent Document 2 is made porous by setting the stretching rate higher in the stretching process. However, a higher stretching rate results in a higher orientation of crystals of polyethylene molecules, making a pore shape flat. This makes it difficult to ensure a high modulus of elasticity.

Means for Solving the Problem

The present invention relates to a separator for use in non-aqueous electrolyte secondary batteries, in which its dynamic hardness DH obtained when the load to an indenter reaches 12 kgf/cm² is 1000 or more.

The dynamic hardness DH is calculated from the following expression.

$$DH = \alpha \times 9.8 P \times d/D^2$$

P: Load (mN/cm²)
d: Tip area of an indenter (cm²)
D: Depth of indentation by the indenter in a sample (separator) (μm)
α: Constant dependent on the shape of the indenter It is preferable that the separator of the present invention includes at least one porous layer X including a polyolefin. The porosity of the porous layer X is preferably 35% or more and 65% or less. In a pore size distribution of the porous layer X measured with a mercury porosimeter, the ratio of pores having a pore size of 0.02 μm or more and 0.2 μm or less is preferably 40 vol % or more relative to a total pore volume.

It is preferable that the separator of the present invention includes at least one porous layer Y including a heat resistant resin. The thermal deformation temperature of the heat resistant resin is preferably 160° C. or more. The thermal deformation temperature is a deflection temperature under load determined with a load of 1.82 MPa according to test method ASTM-D648 of American Society for Testing Materials.

It is particularly preferable that the separator of the present invention includes both the porous layer X and the porous layer Y.

The present invention further relates to a non-aqueous electrolyte secondary battery comprising a positive electrode, a negative electrode, a non-aqueous electrolyte, and a separator interposed between the positive electrode and the negative electrode. Here, the dynamic hardness DH obtained when the load to an indenter reaches 12 kgf/cm² is 1000 or more.

It is preferable that the positive electrode includes a positive electrode active material including a lithium-containing composite oxide. The present invention is particularly effective when the composite oxide includes lithium, cobalt, nickel and aluminum.

The present invention is particularly effective when the negative electrode includes a negative electrode active material including silicon.

Effect of the Invention

The dynamic hardness of the separator is highly correlated to the cycle performance. When the dynamic hardness DH obtained when the load to an indenter reaches 12 kgf/cm² satisfies 1000≦DH, a non-aqueous electrolyte secondary battery with favorable cycle performance can be obtained. The non-aqueous electrolyte impregnated into a separator having a dynamic hardness of 1000 or more is not easily pressed out of the separator even when the battery internal pressure is elevated in association with the expansion of the electrode or the generation of gas. Consequently, the migration of lithium ions is ensured and the increase in the battery resistance is suppressed.

In the case where the separator has the porous layer X including a polyolefin and the porosity of the porous layer X is 35% or more and 65% or less, the voids in the separator is suitable for migration of lithium ions. As such, the electric characteristics of the separator become particularly favorable. In the case where in a pore size distribution of the porous layer X measured with a mercury porosimeter, the ratio of pores having a pore size of 0.02 μm or more and 0.2 μm or less is 40 vol % or more relative to a total pore volume, since a large number of pores having a small pore size exist, the separator becomes homogeneous. As such, the separator has an appropriate elasticity and a high strength.

In the case where the separator has the porous layer Y including a heat resistant resin, and a thermal deformation temperature (deflection temperature under load) of the heat resistant resin is 160° C. or more, it is more unlikely that the separator is compressed or deformed. Moreover, in a high temperature test of the battery also, the presence of the heat resistant resin makes it possible to achieve a high level of safety.

According to the present invention, a non-aqueous electrolyte secondary battery excellent in cycle performance can be provided.

BRIEF DESCRIPTION OF THE DRAWING

FIG. 1 A longitudinal sectional view of a cylindrical lithium ion secondary battery according to Examples of the present invention.

BEST MODE FOR CARRYING OUT THE INVENTION

The dynamic hardness is strength characteristics of materials obtained in the process of indentation of an indenter to a surface of a sample (separator). The dynamic hardness reflects not only the plastic deformation but also the elastic deformation of the sample. For this reason, the dynamic hardness of the separator can serve as an index of easiness of compression or deformation of the separator, and is highly correlated to the cycle performance.

According to the findings of the present inventors, the battery internal pressure elevated because of the generation of gas or the expansion of the electrode during charge and discharge is approximately 12 kfg/cm² at most. For this reason, by setting the load to an indenter to 12 kfg/cm², measurement of the dynamic hardness of the separator in an environment similar to that when the battery internal pressure is elevated becomes possible.

In the separator for use in non-aqueous electrolyte secondary batteries of the present invention, the dynamic hardness obtained when the load to an indenter reaches 12 kgf/cm² (hereinafter referred to as a dynamic hardness (12 kgf/cm²)) is 1000 or more.

In the production of a conventional separator, in order to achieve a favorable impedance, the stretching rate is increased or the amount of solvent to be mixed with separator raw materials is increased. However, in the case of achieving a favorable impedance of the separator, the ratio of pores having a pore size exceeding 0.2 μm tends to be increased, and thus the porosity tends to be considerably increased. As a result, the dynamic hardness is lowered.

The separator having a dynamic hardness (12 kgf/cm²) of 1000 or more is not easily compressed or deformed even when the internal pressure of the battery is elevated, and the thickness retention rate before and after the deformation of the separator is kept at 75% or more. Here, when the thickness before the deformation of the separator is denoted by "T", and the thickness after the deformation of the separator is denoted by "t", the thickness retention rate is expressed by "100 t/T (%)". For this reason, the porosity of the separator is not reduced significantly and favorable battery characteristics are maintained. In order to suppress a reduction in cycle performance more effectively, it is preferable that the dynamic hardness (12 kgf/cm²) is 2000 or more and 8000 or less. When the dynamic hardness (12 kgf/cm²) is less than 1000, the thickness retention rate of the separator becomes less than 75%, and the porosity of the separator is reduced significantly. Accordingly, it is presumed that the number of lithium ions to permeate through the separator is reduced to a half or less. Moreover, because of the compression or deformation of the separator, the pore size of the pores is extremely reduced, and the pores through which a solvent in the electrolyte cannot permeate are increased. As a result, the battery resistance (in particular, the diffusion resistance component) is remarkably increased.

Next, a method of measuring the dynamic hardness (12 kgf/cm²) is described.

Dynamic Ultra Micro Hardness Tester DUH-W201 available from Shimazu Corporation may be used to measure the dynamic hardness. In the Dynamic Ultra Micro Hardness Tester DUH-W201, an indenter is pressed against a sample (separator) until the load applied to the indenter reaches a predetermined value (load P), and an indentation depth D, i.e., a distance from the surface of the sample to the tip of the indenter is measured. The dynamic hardness is expressed by the following expression.

$$DH = \alpha \times 9.8 P \times d/D^2$$

P: Load (mN/cm²)
d: Tip area of an indenter (cm²)
D: Depth of indentation by the indenter in a sample (separator) (μm)
α: Constant dependent on the shape of the indenter The separator, which is the sample, is set on a sample table. After the tip of the indenter is brought into contact with the sample, the indenter is pressed against the sample at a constant loading rate. The load applied to the indenter, after having reached a predetermined value (12 kgf/cm$^2$), is held for 10 seconds. From the indentation depth D and the load P at this time, the dynamic hardness is calculated. It should be noted that the measurement of the dynamic hardness is performed in a constant temperature chamber at an environmental temperature of 20° C. in order to maintain a constant strength of the separator.

It is preferable that the separator of the present invention includes at least one porous layer X including a polyolefin. The porosity of the porous layer X is preferably 35% or more and 65% or less, and particularly preferably 38 to 55%. When the porosity is less than 35%, the impedance of the porous layer X is raised to such an extent that an initial charge/discharge reaction cannot be sufficiently performed, and favorable battery characteristics or cycle performance may not be obtained. On the other hand, when the porosity exceeds 65%, the weight per unit area of the porous layer X is decreased, and the tensile strength or the piercing strength of the separator may be greatly reduced. In such a case, leakage failure or OCV failure occurs easily. The porosity is determined by calculation using a weight W per unit area, a true density D per unit volume, and a thickness T of the porous layer X. Using these denotations, it is expressed by "Porosity=100 [1−W/(D×T)]".

In a pore size distribution of the porous layer X measured with a mercury porosimeter, a ratio of pores having a pore size of 0.02 μm or more and 0.2 μm or less is preferably 40 vol % or more relative to a total pore volume, and particularly preferably 45 vol % or more and 75 vol % or less. Because of the presence of a large number of small pores having a pore size of 0.02 μm or more and 0.2 μm or less, the separator becomes homogenous, and the balance between the elasticity and the strength is optimized. For the mercury porosimeter, Autopore III 9410 available from Shimadzu Corporation may be used. The porous layer X, which is the sample, is cut out into a predetermined size and set on the apparatus. The range of pore size obtained when measured within a pressure range of 20 to 20000 psia is 0.009 μm to 10 μm. The proportion by volume of pores having a pore size of 0.02 μm or more and 0.2 μm or less relative to an integrated pore volume (total pore volume) obtained in this measurement is determined.

It is preferable that the separator of the present invention includes at least one porous layer Y including a heat resistant resin. The thermal deformation temperature of the heat resistant resin is preferably 160° C. or more, and particularly preferably 230° C. or more. The heat resistant resin generally means a resin whose glass transition point (Tg) and melting point (Tm) are sufficiently high (e.g., Tg is 100° C. or more, and Tm is 130° C. or more), and whose thermal decomposition starting temperature accompanying a chemical change is sufficiently high. In the present invention, however, a resin capable of maintaining its mechanical strength even at high temperatures is defined as the heat resistant resin. Accordingly, the heat resistance resin is preferably evaluated in terms of a thermal deformation temperature (deflection temperature under load). A resin having a higher thermal deformation temperature is stronger against compression and deformation, and capable of easily maintaining the shape of the separator. The thermal deformation temperature as used herein refers to a deflection temperature under load determined with a load of 1.82 MPa according to test method ASTM-D648 of American Society for Testing Materials.

The separator of the present invention includes all of the following separators: a separator composed of the porous layer X only (hereinafter referred to as a PO separator), a separator composed of the porous layer Y only (hereinafter referred to as a PA separator), and a separator including the porous layer X and the porous layer Y (hereinafter referred to as a POPA separator). Among these, in particular, the PO separator and the POPA separator are preferred.

Next, one example of a production method of a PO separator is described.

First, a raw material resin of a polyolefin is mixed with an organic matter to serve as a pore-forming material, to prepare a resin composite. The resultant resin composite is formed into a sheet of a thin film. The pore-forming material is extracted from the resultant sheet, followed by sheet-stretching, whereby a PO separator is obtained. The extraction of the pore-forming material creates micropores in the stretched sheet. In order to enhance the pore-forming property, an inorganic fine powder may be added to the resin composite. For the raw material resin, at least one of polyethylene and polypropylene is used. It is preferable, however, that the raw material resin includes at least polyethylene.

Although no particular limitation is imposed on the method of forming the resin composite into a sheet of a thin film, a method in which the resin composite is extruded from a T-die with the use of an extruder, and wound up with a cooling roller is preferred. The resin composite is stirred in the interior of the extruder while heated, and then extruded from the T-die.

No particular limitation is imposed on the method of stretching the resultant sheet, and applicable methods include uniaxial stretching, sequential or simultaneous biaxial stretching, continuous sequential biaxial stretching, and continuous simultaneous biaxial stretching in a continuous tenter clip system.

No particular limitation is imposed on a solvent used for extracting the pore-forming material, and it is possible to used alcohols such as methanol and ethanol, ketones such as acetone and methyl ethyl ketone (MEK), chlorohydrocarbons such as 1,1,1-trichlorethane.

The dynamic hardness of the PO separator can be controlled within a desired range by selecting appropriate types of raw material resin, conditions for extruding a resin composite, method of stretching, etc., and combining these. Moreover, the porosity and the pore size distribution of the PO separator can be controlled within a desired range in a similar manner.

In order to obtain a dynamic hardness (12 kgf/cm$^2$) of 1000 or more, it is desirable to use for a raw material resin, a high density polyethylene having a high bending modulus of elasticity, and a low density polyethylene which is highly flexible to stretching and has a low melting point, by blending these. A higher proportion of the high density polyethylene results in a higher dynamic hardness (12 kgf/cm$^2$) of the PO separator. In the raw material resin, a preferred amount of high density polyethylene is 40 wt % or more relative to a total of the low density polyethylene and the high density polyethylene. It should be noted that the specific gravity of low density polyethylene is 0.93 or less and the specific gravity of high density polyethylene is 0.94 or more.

For the pore-forming material, for example, it is possible to use dibutyl phthalate, dioctyl phthalate, and the like. In order to obtain a high dynamic hardness (12 kgf/cm$^2$), it is suitable that the amount of pore-forming material to be included in the resin composite is 50 to 160 parts by volume per 100 parts by volume of the raw material resin. When the amount of the pore-forming material is too large, the porosity is increased, and thus the pore size of pores tends to be increased. When the amount of the pore-forming material is too small, the raw material resin cannot be stirred sufficiently in the interior of an extruder, and thus the processability is reduced.

The dynamic hardness (12 kgf/cm$^2$) can be controlled also by varying the stretching conditions. With a larger stretching rate, the polyethylene molecules are greatly pulled and expanded in the stretching directions. As a result, oblate pores tend to be formed, or the proportion of pores having a pore size in a pore size distribution of exceeding 0.2 μm tends to be increased. As such, when a load is applied to the separator along the direction of its thickness, an elastic deformation of the separator along its thickness direction is difficult to occur. On the other hand, with a smaller stretching rate, a separator having a sufficient porosity cannot be obtained.

In order to improve the expansion and contraction properties of the separator, a resin having rubber elasticity (e.g., polybutadiene) may be added to the raw material resin.

Next, one example of a production method of a POPA separator is described.

A POPA separator can be obtained, for example, by providing a porous layer Y of a heat resistant resin on a PO separator including a polyolefin (porous layer X). For example, a heat resistant resin is dissolved in a solvent to prepare a solution, and then the resultant solution is applied onto the PO separator. Thereafter, by removing the solvent, the POPA separator can be obtained.

Adding an inorganic oxide filler to the solution of the heat resistant resin makes it possible to form a porous layer Y having a higher heat resistance. For the inorganic oxide filler, for example, it is possible to use alumina, zeolite, silicon nitride, silicon carbide, titanium oxide, zirconium oxide, magnesium oxide, zinc oxide, silicon dioxide, and the like. These maybe used singly or in combination of two or more. These are chemically stable even in a battery interior environment, and do not cause any side reactions which influence the battery characteristics. For the inorganic oxide filler, the one having a high purity is preferably used. A preferred mean particle size of the inorganic oxide filler is 0.05 to 10 μm. A preferred amount of the inorganic oxide filler is 50 to 400 parts by weight per 100 parts by weight of the heat resistant resin.

Examples of the heat resistant resin include aramids (aromatic polyamides), polyamide-imides, polyimides, polyetherimides, polyethylene terephthalates, and polyarylates. These may be used singly or in combination of two or more. Among these, aramids, polyamide-imides and polyimides are particularly preferable in that their capability of retaining an electrolyte is high and their heat resistance is extremely high. Preferable aramids include, for example, polyparaphenylene terephthalamide, polymetaphenylene isophthalamide, and a copolymer of paraphenylene and 3,4-oxydiphenylene terephthalamide.

The POPA separator is obtained, for example, by dissolving an aramid in N-methyl-2-pyrrolidone (hereinafter referred to as NMP), then applying the resultant solution onto the PO separator, and removing the solvent.

Next, one example of a production method of a PA separator is described.

First, a heat resistant resin is dissolved in a solvent to prepare a solution. The resultant solution is applied onto the surface of a base material having a smooth surface (e.g., a glass plate or a stainless steel plate), followed by removing the solvent and then exfoliating the resin film from the base material. A PA separator composed of a porous layer Y only can be obtained in such a manner as described above.

Although no particular limitation is imposed on the thickness of the separator, 8 to 30 μm is suitable as that for non-aqueous electrolyte secondary batteries. In the case of the POPA separator, although no particular limitation is imposed, it is preferable that the thickness of the porous layer X is 8 to 25 μm and the thickness of the porous layer Y is 2 to 10 μm in that the inhibition of adhesion due to the difference in flexibility between the porous layer X and the porous layer Y can be reduced.

It is preferable that the positive electrode includes a positive electrode active material including a lithium-containing composite oxide. Examples of the lithium-containing composite oxide include lithium cobaltate, modified lithium cobaltate, lithium nickelate, modified lithium nickelate, lithium manganate, and modified lithium manganate. The modified lithium cobaltate contains, for example, nickel, aluminum, magnesium, and the like. The modified lithium nickelate contains, for example, cobalt or manganese.

The positive electrode includes a positive electrode active material as an essential component, and includes a binder and a conductive agent as optional components. For the binder, polyvinylidene fluoride (PVDF), modified PVDF, polytetrafluoroethylene (PTFE), modified acrylonitrile rubber particles (e.g., BM-500B (trade name) available from ZEON Corporation), and the like may be used. It is desirable that the PTFE or rubber particles are used in combination with a material with thickening effect, such as carboxymethylcellulose (CMC), polyethylene oxide (PEO), or a soluble modified acrylonitrile rubber (e.g., BM-720H (trade name) available from ZEON Corporation). For the conductive agent, acetylene black, ketjen black and various graphites may be used.

It is preferable that the negative electrode includes a negative electrode active material made of a carbon material such as graphite, a silicon-containing material, a tin-containing material, and the like. For the graphite, either one of natural graphite and artificial graphite may be used. In addition, a metallic lithium, or a lithium alloy containing tin, aluminum, zinc, magnesium, and the like may be used.

The negative electrode includes a negative electrode active material as an essential component, and includes a binder and a conductive agent as optional components. For the binder, PVDF, modified PVDF, a styrene-butadiene copolymer (SBR), modified SBR, and the like may be used. Among these, in terms of the chemical stability, SBR and a modified product thereof are particularly preferred. It is preferable that the SBR and the modified product thereof are used in combination with a cellulose resin, such as CMC.

The present invention is particularly effective in the battery design in which the battery internal pressure easily increases.

For example, in the case of using lithium nickelate for the positive electrode active material, as a result of repeated charge and discharge, gas generation due to the decomposition of the non-aqueous electrolyte easily occurs. The present invention is particularly effective when a lithium nickelate containing cobalt and aluminum, or a lithium manganate containing cobalt and nickel is used, and effective when a composite oxide containing lithium, cobalt, nickel, and aluminum (e.g., $Li_xCo_{1-y-z}Ni_yAl_zO_w$, $0<x\leq1.05$, $0.1\leq y\leq0.85$, $0.01\leq z\leq0.25$, $1.8\leq w\leq2.1$, and $0.11\leq y+z\leq0.95$) is used. In the foregoing, it is further preferable that $0.3\leq y\leq0.75$, and $0.05\leq z\leq0.20$. The composite oxide containing lithium, cobalt, nickel, and aluminum is highly active and easily promotes the decomposition of the electrolyte, and therefore, in general, the cycle performance is easily deteriorated. However, in the case of using the separator of the present invention, even when the battery internal pressure is elevated considerably because of gas generation, the deterioration in the cycle performance can be prevented.

In the case of using a material whose expansion coefficient during charge is large, such as a silicon alloy, a tin alloy, silicon oxide, tin oxide, and simple silicon substance (e.g., a vapor-deposited silicon film) for the negative electrode active material, the battery internal pressure is easily elevated. In particular, the expansion coefficient of a negative electrode active material containing silicon is extremely large when having absorbed lithium, and this is a cause of a significant increase in the battery internal pressure. For this reason, the present invention is particularly effective when a negative electrode active material containing silicon is used. In the case of using silicon oxide ($SiO_a$), it is preferable that $0<a<2.0$, and further preferable that $0.1 \leq a \leq 1.5$.

For the non-aqueous electrolyte, a non-aqueous solvent with a lithium salt dissolved therein is preferably used. For the lithium salt, it is possible to use, for example, $LiPF_6$, $LiBF_4$, and the like. For the non-aqueous solvent, it is possible to use, for example, ethylene carbonate (EC), propylene carbonate (PC), dimethyl carbonate (DMC), diethyl carbonate (DEC), ethyl methyl carbonate (EMC), and the like. It is preferable that two or more of these are used in combination.

To the non-aqueous electrolyte, it is preferable to add an additive for forming a favorable film on the positive electrode or the negative electrode. Examples of the additive include vinylene carbonate (VC), vinylethylene carbonate (VEC), and cyclohexylbenzene (CHB).

The present invention is specifically described below with reference to Examples. It should be noted that the following merely describes examples of the present invention, and therefore, the present invention is not limited to the following Examples.

EXAMPLES

Example 1

(a) Fabrication of Positive Electrode

A positive electrode material mixture paste was prepared by stirring, with a double arm kneader, 3 kg of lithium cobaltate serving as a positive electrode active material, 1 kg of "#1320 (trade name)" available from KUREHA CORPORATION (an NMP solution containing 12 wt % of PVDF) serving as a positive electrode binder, 90 g of acetylene black serving as a conductive agent, and an appropriate amount of NMP. The positive electrode material mixture paste was applied onto both faces of a 15-µm-thick band-shaped positive electrode current collector made of an aluminum foil, except for a connecting portion for a positive electrode lead. The applied positive electrode material mixture paste was dried, and rolled with rollers to form a positive electrode material mixture layer. The density of the active material layer in the positive electrode material mixture layer (weight of active material/volume of material mixture layer) was 3.3 g/cm³. The total thickness of the positive electrode current collector and the positive electrode material mixture layers carried on both faces thereof was controlled to be 160 µm. The electrode plate thus obtained was cut into a width that could be inserted into a battery can for a cylindrical battery (diameter: 18 mm, and height: 65 mm), whereby a positive electrode was obtained.

(b) Fabrication of Negative Electrode

A negative electrode material mixture paste was prepared by stirring, with a double arm kneader, 3 kg of artificial graphite serving as a negative electrode active material, 75 g of "BM-400B (trade name)" available from ZEON Corporation (an aqueous dispersion containing 40 wt % of modified SBR) serving as a negative electrode binder, 30 g of CMC serving as a thickener, and an appropriate amount of water. The negative electrode material mixture paste was applied onto both faces of a 10-µm-thick band-shaped negative electrode current collector made of a copper foil, except for a connecting portion for a negative electrode lead. The applied negative electrode material mixture paste was dried, and rolled with rollers to form a negative electrode material mixture layer. The density of the active material layer in the negative electrode material mixture layer (weight of active material/volume of material mixture layer) was 1.4 g/cm³. The total thickness of the negative electrode current collector and the negative electrode material mixture layers carried on both faces thereof was controlled to be 180 µm. The electrode plate thus obtained was cut into a width that could be inserted into the foregoing battery case, whereby a negative electrode was obtained.

(c) Fabrication of Separator

For a raw material resin, a high density polyethylene ("HJ560 (trade name)" available from Japan Polyethylene Corporation) and a low density polyethylene ("LJ803 (trade name)" available from Japan Polyethylene Corporation) were used.

A granulated resin composite was obtained by mixing 30 parts by weight of high density polyethylene (HPE), 25 parts by weight of low density polyethylene (LPE), and 45 parts by weight of dioctyl phthalate serving as a pore-forming material at 220° C. The resultant resin composite was melt-kneaded at 220° C. in an extruder with a T-die attached to the tip thereof, and then extruded. The extruded sheet was rolled until its area became five times as large as that before rolling, by passing the sheet through rolls heated to 120 to 125° C., whereby a 100-µm-thick sheet was obtained.

This sheet was immersed into methyl ethyl ketone to extract and remove dioctyl phthalate. The sheet obtained in this manner was subjected to uniaxial stretching in a 125° C. environment, so that the sheet was stretched until its width became 3.8 times as large as that before stretching, whereby a 20-µm-thick PO separator (lot No. 1) was obtained.

A dynamic hardness DH (12 kgf/cm²) of the separator thus obtained was measured with the use of Dynamic Ultra Micro Hardness Tester DUH-W201 available from Shimazu Corporation. In this measurement, a triangular pyramid indenter (ridge angle: 120°, tip diameter: 0.5 mmØ, tip area d: 0.0019625 cm², and constant α=3.8584) was used. First, the tip of the indenter was brought into contact with a sample, and then the indenter was pressed against the sample at a loading rate of 7.2 gf/sec. When the load applied to the indenter reached 12 kgf/cm², it was held for 10 seconds. From the indentation depth D and the load at this time, the dynamic hardness was calculated. It should be noted that the measurement of the dynamic hardness was performed in a constant temperature chamber at an environmental temperature of 20° C.

A porosity of the separator was calculated using a weight W per unit area, a true density D per unit volume, and a thickness T of the separator.

With the use of a mercury porosimeter, a pore size distribution of the separator was measured. For the mercury porosimeter, Autopore III 9410 available from Shimadzu Corporation was used. A set of samples consisting of 30 pieces of separator cut into a size of 3 cm×2 cm was prepared. A pore size distribution was measured within a pressure range from 20 to 20000 psia, to obtain a pore size distribution in which the range of pore size was 0.009 μm to 10 μm was obtained. A proportion by volume of the pores having a pore size of 0.02 μm or more and 0.2 μm or less relative to an integrated pore volume (total pore volume) was determined.

(d) Preparation of Non-Aqueous Electrolyte

A non-aqueous electrolyte was obtained by dissolving $LiPF_6$ at a concentration of 1 mol/L in a non-aqueous solvent mixture including ethylene carbonate (EC), dimethyl carbonate (DMC) and ethyl methyl carbonate (EMC) in a volume ratio of 2:3:3. Three parts by weight of vinylene carbonate (VC) was added per 100 parts by weight of the resultant non-aqueous electrolyte.

(e) Fabrication of Battery

The foregoing positive electrode, negative electrode, separator, non-aqueous electrolyte were used to fabricate a cylindrical battery as shown in FIG. 1 in the manner as described below.

First, to the lead connecting portions in a positive electrode 5 and a negative electrode 6, one end of a positive electrode lead 5a and a negative electrode lead 6a were connected, respectively. Thereafter, the positive electrode 5 and the negative electrode 6 were wound with a separator 7 interposed therebetween, thereby to form a cylindrical electrode assembly whose outer circumference was covered with the separator 7. The electrode assembly was sandwiched with an upper insulating ring 8a and a lower insulating ring 8b, and then housed in a battery can 1. Subsequently, 5 g of the foregoing non-aqueous electrolyte was injected into the battery can 1. The pressure in the battery can 1 was then reduced to 133 Pa, thereby allowing the electrode assembly to be impregnated with the electrolyte. In this process, the battery can with the battery assembly was left until no residual electrolyte was observed on the surface of the electrode assembly.

Thereafter, the other end of the positive electrode lead 5a was welded to the back face of a battery lid 2, and the other end of the negative electrode lead 6a was welded to the inner bottom face of the battery can 1. Finally, with the battery lid 2 with an insulating packing 3 disposed on the rim thereof, an opening of the battery can 1 was closed, whereby a cylindrical lithium ion secondary battery having a theoretical capacity of 2 Ah was fabricated.

[Evaluation Test]

In line with the following conditions (1) and (2), a preliminary charge/discharge was performed twice on the battery.

(1) Constant current discharge: 400 mA (cut-off voltage 3 V)

(2) Constant current charge: 1400 mA (cut-off voltage 4.2 V)

The battery in a charged state having been subjected to the preliminary charge/discharge was stored for seven days in a 45° C. environment. Thereafter, charge/discharge was performed in line with the following conditions (1) to (6) in a 20° C. environment, to obtain a battery in an initial state.

(1) Constant current discharge: 400 mA (cut-off voltage 3 V)

(2) Constant current charge: 1400 mA (cut-off voltage 4.2 V)

(3) Constant voltage charge: 4.2 V (cut-off current 100 mA)

(4) Constant current discharge: 2000 mA (cut-off voltage 3 V)

(5) Constant current charge: 1400 mA (cut-off voltage 4.2 V)

(6) Constant voltage charge: 4.2 V (cut-off current 100 mA)

Here, in the constant current discharge under the condition (4), a discharge capacity $C_{20}$ at 20° C. was measured.

(Cycle Test)

With respect to the battery in an initial state (immediately after having been subjected to the constant voltage charge at 4.2 V), a cycle test was performed in line with the following conditions (7a) to (9a) in a 45° C. environment.

(7a) Constant current discharge: 2000 mA (cut-off voltage 3 V)

(8a) Constant current charge: 1400 mA (cut-off voltage 4.2 V)

(9a) Constant voltage charge: 4.2 V (cut-off current 100 mA)

The cycle test was terminated at the time when the discharge capacity was reduced to 70% of the initial capacity. The number of cycles repeated until the test was terminated is shown in Table 1 as a cycle performance.

(Low-Temperature Rate Test)

A battery in an initial state (immediately after having been subjected to the constant voltage charge at 4.2 V) was left for five hours at an environmental temperature of −10° C. Thereafter, a constant current discharge was performed under the condition (7b) below while the temperature was maintained at −10° C., to determine a discharge capacity $C_{low}$ at a low temperature.

(7b) Constant current discharge: 2000 mA (cut-off voltage 3 V)

The proportion of the discharge capacity $C_{low}$ at a low temperature relative to the discharge capacity $C_{20}$ at 20° C. was calculated as a percentage. The value thus obtained is shown in Table 1 as a low-temperature rate performance.

Example 2

A PO separator (lot No. 2) was fabricated in the same manner as in Example 1 except that a resin composite obtained by mixing 30 parts by weight of high density polyethylene, 20 parts by weight of low density polyethylene, and 50 parts by weight of dioctyl phthalate was used, and the stretching rate was set to 3.3 times. A cylindrical battery was fabricated in the same manner as in Example 1 except that the separator of lot No. 2 was used, and evaluated in the same manner. The thickness of the separator of lot No. 2 was 23 μm.

Example 3

A PO separator (lot No. 3) was fabricated in the same manner as in Example 1 except that a resin composite obtained by mixing 30 parts by weight of high density polyethylene, 15 parts by weight of low density polyethylene, and 55 parts by weight of dioctyl phthalate was used, and the stretching rate was set to 2.9 times. A cylindrical battery was fabricated in the same manner as in Example 1 except that the separator of lot No. 3 was used, and evaluated in the same manner. The thickness of the separator of lot No. 3 was 24 μm.

Example 4

A PO separator (lot No. 4) was fabricated in the same manner as in Example 1 except that a resin composite obtained by mixing 40 parts by weight of high density polyethylene, 40 parts by weight of low density polyethylene, and 20 parts by weight of dioctyl phthalate was used, and the stretching rate was set to 3.9 times. A cylindrical battery was fabricated in the same manner as in Example 1 except that the separator of lot No. 4 was used, and evaluated in the same manner. The thickness of the separator of lot No. 4 was 21 μm.

Example 5

A PO separator (lot No. 5) was fabricated in the same manner as in Example 1 except that a resin composite obtained by mixing 40 parts by weight of high density polyethylene, 35 parts by weight of low density polyethylene, and 25 parts by weight of dioctyl phthalate was used, and the stretching rate was set to 3.9 times. A cylindrical battery was fabricated in the same manner as in Example 1 except that the separator of lot No. 5 was used, and evaluated in the same manner. The thickness of the separator of lot No. 5 was 22 μm.

Example 6

A PO separator (lot No. 6) was fabricated in the same manner as in Example 1 except that a resin composite obtained by mixing 15 parts by weight of high density polyethylene, 15 parts by weight of low density polyethylene, and 70 parts by weight of dioctyl phthalate was used, and the stretching rate was set to 3.5 times. A cylindrical battery was fabricated in the same manner as in Example 1 except that the separator of lot No. 6 was used, and evaluated in the same manner. The thickness of the separator of lot No. 6 was 24 μm.

Example 7

A PO separator (lot No. 7) was fabricated in the same manner as in Example 1 except that a resin composite obtained by mixing 10 parts by weight of high density polyethylene, 10 parts by weight of low density polyethylene, and 80 parts by weight of dioctyl phthalate was used, and the stretching rate was set to 3.5 times. A cylindrical battery was fabricated in the same manner as in Example 1 except that the separator of lot No. 7 was used, and evaluated in the same manner. The thickness of the separator of lot No. 7 was 23 μm.

Example 8

A PO separator (lot No. 8) was fabricated in the same manner as in Example 1 except that a resin composite obtained by mixing 25 parts by weight of high density polyethylene, 35 parts by weight of low density polyethylene, and 40 parts by weight of dioctyl phthalate was used, and the stretching rate was set to 3.8 times. A cylindrical battery was fabricated in the same manner as in Example 1 except that the separator of lot No. 8 was used, and evaluated in the same manner. The thickness of the separator of lot No. 8 was 20 μm.

Example 9

A PO separator (lot No. 9) was fabricated in the same manner as in Example 1 except that a resin composite obtained by mixing 50 parts by weight of high density polyethylene, 10 parts by weight of low density polyethylene, and 40 parts by weight of dioctyl phthalate was used, and the stretching rate was set to 3.8 times. A cylindrical battery was fabricated in the same manner as in Example 1 except that the separator of lot No. 9 was used, and evaluated in the same manner. The thickness of the separator of lot No. 9 was 21 μm.

Example 10

On one face of the PO separator (lot No. 2) as fabricated in Example 2, a porous layer Y made of a heat resistant resin was formed. For the heat resistant resin, an aramid resin having a thermal deformation temperature of 260° C. (a deflection temperature under load determined under a load of 1.82 MPa according to ASTM-D648) was used.

The aramid resin was synthesized in the following manner.
To 100 parts by weight of NMP, 6.5 parts by weight of dried anhydrous calcium chloride was added, and heated in a reaction bath to 80° C. to be completely dissolved. After the NMP solution of calcium chloride thus obtained was cooled to room temperature, paraphenylenediamine was added in an amount of 3.2 parts by weight and completely dissolved. Thereafter, the reaction bath was placed in a constant temperature chamber at 20° C., where 5.8 parts by weight of terephthalic acid dichloride was dropped to the NMP solution over a one-hour period. Thereafter, the NMP solution was left in the constant temperature chamber at 20° C. for one hour to allow the polymerization reaction to proceed, whereby polyparaphenylene terephthalamide (hereinafter abbreviated as PPTA) was synthesized.

After the completion of the reaction, the NMP solution (polymerized liquid) was moved from the constant temperature chamber to a vacuum chamber, where the NMP solution was stirred for 30 minutes under reduced pressure, thereby to be degasified. The resultant polymerized liquid was further diluted with NMP. The aramid resin was separated from the solution, and formed into a predetermined shape complying with ASTM. The thermal deformation temperature thereof was measured, and it was 260° C.

Moreover, in order to form a porous layer Y including a filler and aramid (a heat resistant resin), 200 parts by weight of fine particulate alumina (mean particle size: 0.05 μm) was added per 100 parts by weight of aramid resin (PPTA), and then stirred. As a result, an NMP dispersion including an aramid resin and a filler, and having a PPTA concentration of 1.4 wt % was obtained.

The resultant NMP dispersion including an aramid resin and a filler was thinly applied on one face of the PO separator of lot No. 2 (porous layer X) with a doctor blade, and dried with hot air of 80° C. (blowing rate: 0.5 m/sec), to form a porous layer Y. The POPA separator thus obtained (lot No. 10) was washed sufficiently with pure water in order to remove the calcium chloride as well as to form micropores in the porous layer Y, and then dried. The thickness of the porous layer Y was 4 μm.

A cylindrical battery was fabricated in the same manner as in Example 1 except that the separator of lot No. 10 was used and the porous layer Y made of an aramid resin was arranged in the positive electrode side (i.e., the porous layer X was arranged in the negative electrode side), and evaluated in the same manner.

Example 11

A POPA separator (lot No. 11) was fabricated in the same manner as in Example 10 except that the PO separator of lot No. 3 (porous layer X) as fabricated in Example 3 was used in place of the PO separator of lot No. 2. A cylindrical battery was fabricated in the same manner as in Example 1 except that the separator of lot No. 11 was used, and evaluated in the same manner. The thickness of the porous layer Y was also 4 μm.

Comparative Example 1

A PO separator (lot No. 12) was fabricated in the same manner as in Example 1 except that a resin composite obtained by mixing 30 parts by weight of high density polyethylene, 30 parts by weight of low density polyethylene, and 40 parts by weight of dioctyl phthalate was used, and the stretching rate was set to 6.3 times. A cylindrical battery was fabricated in the same manner as in Example 1 except that the separator of lot No. 12 was used, and evaluated in the same manner. The thickness of the separator of lot No. 12 was 22 μm.

TABLE 1

| | Positive electrode active material | Negative electrode active material | Separator lot No. | HPE wt % | LPE wt % | Pore forming material wt % | Stretching times | Porous layer Y | Dynamic hardness DH | Porosity % | 0.02 to 0.2 μm volume ratio % | Cycle performance cycles | Low temperature rate performance % |
|---|---|---|---|---|---|---|---|---|---|---|---|---|---|
| Com Ex. 1 | lithium cobaltate | Artificial graphite | 12 | 30 | 30 | 40 | 6.3 | | 500 | 42 | 45 | 200 | 80 |
| Ex. 1 | | | 1 | 30 | 25 | 45 | 3.8 | | 1000 | 43 | 46 | 300 | 83 |
| Ex. 2 | | | 2 | 30 | 20 | 50 | 3.3 | | 3000 | 44 | 47 | 350 | 81 |
| Ex. 3 | | | 3 | 30 | 15 | 55 | 2.9 | | 5000 | 45 | 45 | 700 | 82 |
| Ex. 4 | | | 4 | 40 | 40 | 20 | 3.9 | | 2600 | 30 | 42 | 310 | 65 |
| Ex. 5 | | | 5 | 40 | 35 | 25 | 3.9 | | 2600 | 35 | 46 | 330 | 78 |
| Ex. 6 | | | 6 | 15 | 15 | 70 | 3.5 | | 2000 | 65 | 42 | 290 | 83 |
| Ex. 7 | | | 7 | 10 | 10 | 80 | 3.5 | | 1000 | 70 | 43 | 250 | 86 |
| Ex. 8 | | | 8 | 25 | 35 | 40 | 3.8 | | 1600 | 46 | 30 | 280 | 82 |
| Ex. 9 | | | 9 | 50 | 10 | 40 | 3.8 | | 3500 | 42 | 55 | 420 | 83 |
| Ex. 10 | | | 10 | 30 | 20 | 50 | 3.3 | Aramid | 3500 | 44 | 47 | 450 | 84 |
| Ex. 11 | | | 11 | 30 | 15 | 55 | 2.9 | Aramid | 7000 | 45 | 45 | 750 | 83 |

By comparison among Examples 1 to 11 and Comparative Example 1, it was confirmed that by controlling the dynamic hardness to be 1000 or more, the cycle performance was improved. It is considered that this was because even when the expansion or contraction of the electrode had repeated, or gas had generated in the battery, the compression or deformation of the separator was suppressed, and the change in impedance of the separator was suppressed. By comparison between the cases where the dynamic hardness is equivalent to one another, a remarkable improvement was observed particularly in the cycle performance in the case where the porosity of the separator was 35% or more and 65% or less.

It should be noted that in Example 4, although an improvement in the cycle performance was confirmed, it was observed that the discharge performance at a low temperature (low-temperature rate performance) tended to reduce. The reduction in the low-temperature rate performance is considered to be correlated to the condition that the porosity of the separator is 30%. It is considered that by virtue of the dynamic hardness of 2600, the deterioration was suppressed with respect to the elevation of battery internal pressure during cycle test, but because of an originally high impedance of the separator, the migration of lithium ions was limited at a low temperature.

In Example 7, an improvement in the cycle performance was confirmed; however, when many batteries were fabricated, OCV failure was observed in some batteries. It is considered that because of a high porosity of the separator, as high as 70%, the piercing strength was reduced.

In Example 10 and Example 11, a remarkable improvement was observed particularly in the cycle performance. In these Examples, the separator having a porous layer Y made of an aramid resin was used.

It is considered that since the compression elasticity of heat resistant resins such as an aramid resin is low as compared with that of polyethylene, the deformation of the separator was remarkably suppressed.

Example 12

A cylindrical battery was fabricated in the same manner as in Example 10 except that lithium nickelate containing cobalt and aluminum ($LiCo_{0.2}Ni_{0.65}Al_{0.15}O_2$) was used in place of the lithium cobaltate as a positive electrode active material, and evaluated in the same manner.

Example 13

A cylindrical battery was fabricated in the same manner as in Example 12 except that simple silicon substance was used as a negative electrode active material, and evaluated in the same manner. For the negative electrode, the one obtained by forming a thin film made of simple silicon substance having a thickness of approximately 15 μm on a negative electrode current collector was used. The thin film made of simple silicon substance was formed by means of a vacuum vapor deposition method.

Example 14

A cylindrical battery was fabricated in the same manner as in Example 12 except that silicon oxide was used as a negative electrode active material and the separator of lot No. 2 was used in place of the separator of lot No. 10, and evaluated in the same manner. The negative electrode including silicon oxide was fabricated in the following manner.

An electrolytic copper foil (available from Furukawa Circuit Foil Co., Ltd., thickness: 18 μm) serving as a negative electrode current collector was fixed to a water-cooling roller disposed in a vapor deposition apparatus. Right below the negative electrode current collector, a graphite crucible with silicon (purity: 99.999%, an ingot available from Furuuchi Chemical Corporation) placed therein was arranged, and a nozzle for introducing oxygen gas was disposed between the crucible and the copper foil. Vapor deposition was performed with the use of electron beam, while oxygen gas (available from Nippon Sanso Corporation, purity: 99.7%) was introduced to the interior of the vapor deposition apparatus at a flow rate of 10 sccm (20 $cm^3$/min). In terms of the vapor deposition conditions, the accelerating voltage and the current were set at −8 kV and 150 mA, respectively.

In the manner as described above, a negative electrode active material having a thickness of approximately 15 μm was formed on one face of the electrolytic copper foil.

The content of oxygen in the negative electrode active material was measured by a combustion method. The result found that the negative electrode active material was silicon oxide expressed by $SiO_{0.3}$. X-ray diffractometry revealed that the resultant silicon oxide was amorphous.

Example 15

A cylindrical battery was fabricated in the same manner as in Example 14 except that the POPA separator of lot No. 10 as fabricated in Example 10 was used in place of the separator of lot No. 2, and evaluated in the same manner.

Comparison Example 2

A cylindrical battery was fabricated in the same manner as in Example 12 except that the PO separator of lot No. 12 as fabricated in Comparative Example 1 was used in place of the separator of lot No. 10, and evaluated in the same manner.

Comparison Example 3

A cylindrical battery was fabricated in the same manner as in Example 13 except that the PO separator of lot No. 12 as fabricated in Comparative Example 1 was used in place of the separator of lot No. 10, and evaluated in the same manner.

Comparison Example 4

A cylindrical battery was fabricated in the same manner as in Example 14 except that the PO separator of lot No. 12 as fabricated in Comparative Example 1 was used in place of the separator of lot No. 2, and evaluated in the same manner.

The evaluation results of Examples 12 to 15 and Comparative Examples 2 to 4 are shown in Table 2.

effects. It is considered that this was because, as in the case of using a negative electrode active material containing silicon, the compression or deformation of the separator was suppressed.

As described above, the present invention is particularly effective in a battery in which a large amount of gas is generated by a side reaction and the expansion rate of an electrode is high.

INDUSTRIAL APPLICABILITY

The present invention is applicable to various non-aqueous electrolyte secondary batteries, and in particular, is effective in a battery in which an elevation of battery internal pressure due to gas generation or expansion of the electrode easily occurs. The shape of a non-aqueous electrolyte secondary battery to which the present invention is applicable is not particularly limited, and may be any shape of, for example, a cylindrical type, a prismatic type, a coin type, a button type, a sheet type, or a flat type. The form of the electrode assembly comprising a positive electrode, a negative electrode, and a

TABLE 2

| | Positive electrode active material | Negative electrode active material | Separator Lot No. | HPE wt % | LPE wt % | Pore forming material wt % | Stretching times | Porous layer Y | Dynamic hardness DH | Porosity % | 0.02 to 0.2 μm volume ratio % | Cycle performance cycles | Low temperature rate performance % |
|---|---|---|---|---|---|---|---|---|---|---|---|---|---|
| Com Ex. 2 | Co, Al-containing lithium nickelate | Artificial graphite | 12 | 30 | 30 | 40 | 6.3 | | 500 | 42 | 45 | 180 | 81 |
| Com Ex. 3 | | Silicon | 12 | 30 | 30 | 40 | 6.3 | | 500 | 42 | 45 | 150 | 77 |
| Com Ex. 4 | | Silicon oxide | 12 | 30 | 30 | 40 | 6.3 | | 500 | 42 | 45 | 170 | 79 |
| Ex. 12 | | Artificial graphite | 10 | 30 | 20 | 50 | 3.3 | Aramid | 3500 | 44 | 47 | 410 | 82 |
| Ex. 13 | | Silicon | 10 | 30 | 20 | 50 | 3.3 | Aramid | 3500 | 44 | 47 | 320 | 78 |
| Ex. 14 | | Silicon | 2 | 30 | 20 | 50 | 3.3 | | 3000 | 44 | 47 | 360 | 80 |
| Ex. 15 | | oxide | 10 | 30 | 20 | 50 | 3.3 | Aramid | 3500 | 44 | 47 | 400 | 81 |

From the results in Table 2, it was confirmed that even in the case where a positive electrode active material or a negative electrode active material with which the elevation of battery internal pressure is easily accelerated was used, the use of the separator of the present invention makes it possible to achieve excellent cycle performance and low-temperature rate performance.

In general, lithium nickelate containing cobalt and aluminum, or lithium manganate containing cobalt and nickel tends to easily react with an electrolyte and generate a large amount of gas as compared with lithium cobaltate. As such, the elevation of battery internal pressure easily occurs.

Moreover, it is known that since a negative electrode active material containing silicon has a large capacity, its expansion rate due to absorption of lithium is high. For this reason, when the negative electrode active material containing silicon is used, the elevation of battery internal pressure easily occurs. It is considered that excellent evaluation results were obtained notwithstanding such a situation because the compression or deformation of the separator was suppressed.

Also in the case where a negative electrode active material containing silicon oxide ($SiO_{0.3}$) is used as in Examples 14 and 15, as in the case where a negative electrode active material containing silicon is used, the elevation of battery internal pressure easily occurs. However, the use of the separator of the present invention made it possible to achieve excellent separator may be of a wound type or a stacked type. The size of the battery may be a small size for use in small portable equipment etc., or a large size for use in electric automobiles etc. The non-aqueous electrolyte secondary battery of the present invention may be used as a power source for, for example, portable information terminals, portable electronic equipment, electric power storage apparatus for household use, two-wheeled motor vehicles, electric automobiles, hybrid electric automobiles, and the like. However, no particular limitation is imposed on the application thereof.

The invention claimed is:

1. A separator for a non-aqueous electrolyte secondary battery, comprising:
    at least one porous layer X including a polyolefin, a porosity of said porous layer X being 35% or more and 65% or less, said porous layer X having a dynamic hardness DH of 1000 or more when the load to an indenter reaches 12 kgf/cm$^2$,
    said polyolefin including a high density polyethylene and a low density polyethylene,
    the amount of the high density polyethylene being 40 wt % or more relative to a total of the low density polyethylene and the high density polyethylene,
    the specific gravity of the low density polyethylene being 0.93 or less and the specific gravity of the high density polyethylene being 0.94 or more, wherein, in a pore size distribution of said porous layer X measured with a mercury porosimeter, a ratio of pores having a pore size of 0.02 μm or more and 0.2 μm or less is 30-75 vol % relative to a total pore volume.

2. The separator in accordance with claim 1, comprising:

at least one porous layer Y including a heat resistant resin, a thermal deformation temperature of said heat resistant resin being 160° C. or more, said thermal deformation temperature being a deflection temperature under load determined with a load of 1.82 MPa according to test method ASTM-D648 of American Society for Testing Materials.

3. A non-aqueous electrolyte secondary battery comprising a positive electrode, a negative electrode, a non-aqueous electrolyte, and the separator in accordance with claim 1 interposed between said positive electrode and said negative electrode.

4. The non-aqueous electrolyte secondary battery in accordance with claim 3, wherein said positive electrode includes a positive electrode active material including a lithium-containing composite oxide; and said composite oxide includes lithium, cobalt, nickel and aluminum.

5. The non-aqueous electrolyte secondary battery in accordance with claim 3, wherein said negative electrode includes a negative electrode active material including silicon.

6. The separator in accordance with claim 1, wherein said porous layer X has a dynamic hardness DH of 2000 or more and 8000 or less when the load to an indenter reaches 12 kgf/cm$^2$.

7. The separator in accordance with claim 1, wherein said porous layer X has a dynamic hardness DH of 3000 or more and 8000 or less when the load to an indenter reaches 12 kgf/cm$^2$.

* * * * *